W. H. DAMON.
SUN AND RAIN SHIELD FOR AUTOMOBILES.
APPLICATION FILED JAN. 31, 1919.

1,394,254.

Patented Oct. 18, 1921.

Inventor:
William H. Damon,
by Hazard & Miller
Attys.

UNITED STATES PATENT OFFICE.

WILLIAM H. DAMON, OF LOS ANGELES, CALIFORNIA.

SUN AND RAIN SHIELD FOR AUTOMOBILES.

1,394,254.　　　　　Specification of Letters Patent.　　Patented Oct. 18, 1921.

Application filed January 31, 1919. Serial No. 274,297.

*To all whom it may concern:*

Be it known that I, WILLIAM H. DAMON, a citizen of the United States, residing at Los Angeles, in the county of Los Angeles and State of California, have invented new and useful Improvements in Sun and Rain Shields for Automobiles, of which the following is a specification.

My object is to make a sun and rain shield, and my invention consists of the novel features herein shown, described and claimed.

Figure 1:
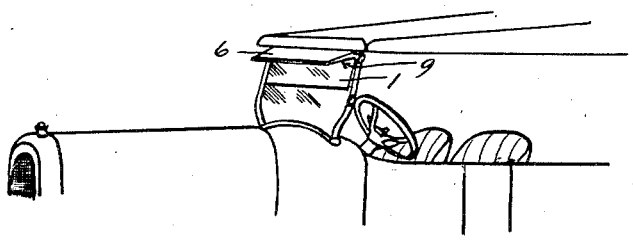
Figure 1 is a perspective showing a sun and rain shield embodying the principles of my invention in use, parts of the automobile being broken away to economize space.
Figure 2:
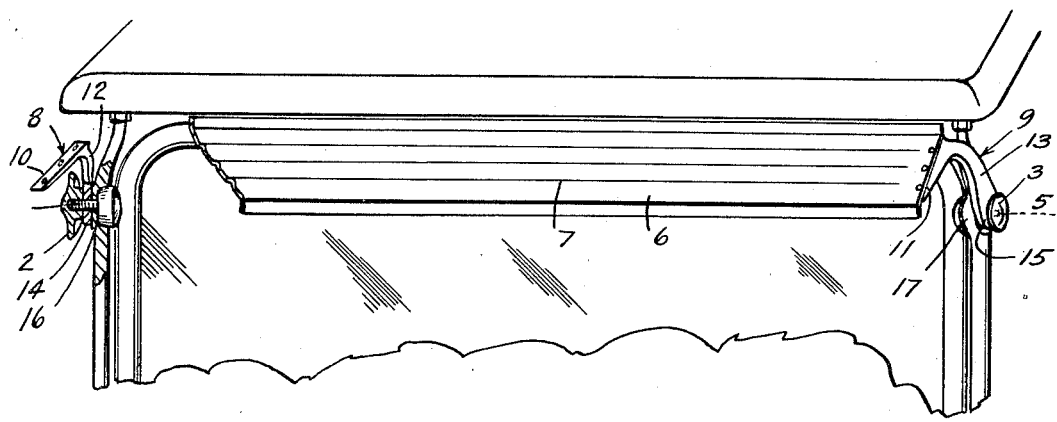
Fig. 2 is an enlarged fragmentary perspective showing the details of construction of the sun and rain shield.

In applying my sun and rain shield to an automobile having a swinging upper wind shield 1, I remove the nuts 2 and 3 from the studs 4 and 5, said studs 4 and 5 being the pivots upon which the upper wind shield 1 swings.

The sun and rain shield body 6 is preferably formed of sheet metal pressed into shape to produce longitudinal corrugations 7 to stiffen the body. Brackets 8 and 9 are attached to the ends of the body 6, said brackets 8 and 9 being substantially alike. The brackets 8 and 9 comprise attaching plates 10 and 11 secured to the ends of the body 6 by rivets, arms 12 and 13 extending downwardly and backwardly from the rear ends of the plates 10 and 11, and bearings 14 and 15 upon the lower ends of the arms 12 and 13 and fitting upon the studs 4 and 5, so that the nuts 2 and 3 may be replaced upon the ends of the studs to clamp the bearings 14 and 15 against the bearings 16 and 17 in the wind shield frame and hold the body 6 in its adjusted position.

It is obvious that by loosening the nuts 2 and 3 the body 6 may be adjusted up and down as desired, and that by tightening the nuts the body will be held rigidly in place.

Figure 3:
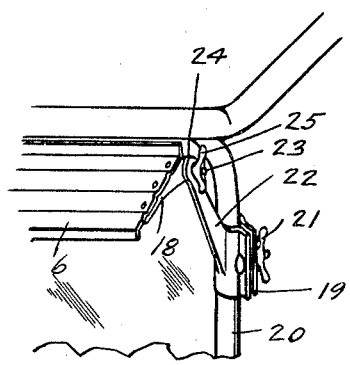
Fig. 3 is a fragmentary perspective showing a modified construction.

In the modification shown in Fig. 3 the body 6 is secured to attaching plates 18 by rivets. Clamps 19 fit upon the side frames 20 of the wind shield and are adjustable up and down by manipulating the clamping nuts 21. Arms 22 extend from the clamps 19 and pintles 23 extend from the rear ends of the attaching plates 18 through bearings 24 in the upper ends of the arms 22, and clamping nuts 25 are screwed upon the pintles 23 to hold the sun and rain shield body 6 in its adjusted position.

In some cases it may be desirable to have the clamps fit the horizontal top frame of the wind shield instead of fitting the side frames.

It is obvious that the clamps engaging the wind shield frame and brackets extending from the clamps may be made to fit wind shields of various styles and that the sun and rain shield body 6 may be made of various lengths to suit the requirements.

Various changes may be made without departing from the spirit of my invention as claimed.

I claim:

The combination with windshield supporting members, of inverted L-shaped brackets having the lower ends of their vertical legs pivotally and adjustably connected to the upper portions of said windshield supporting members, and a corrugated metal plate having its ends secured to the horizontal arms of said inverted L-shaped brackets.

In testimony whereof I have signed my name to this specification.

WILLIAM H. DAMON.